(12) United States Patent
Davis

(10) Patent No.: US 7,768,916 B2
(45) Date of Patent: Aug. 3, 2010

(54) USE OF NEGATIVE CLASSIFIERS FOR INTERNET TRAFFIC

(75) Inventor: Brian Alan Davis, Medford, MA (US)

(73) Assignee: Cisco Technology, Inc., San Jose, CA (US)

( * ) Notice: Subject to any disclaimer, the term of this patent is extended or adjusted under 35 U.S.C. 154(b) by 1044 days.

(21) Appl. No.: 11/274,590

(22) Filed: Nov. 14, 2005

(65) Prior Publication Data

US 2007/0109965 A1     May 17, 2007

(51) Int. Cl.
*H04L 12/26* (2006.01)
(52) U.S. Cl. .................................. 370/230.1
(58) Field of Classification Search ................ 370/230, 370/231, 235
See application file for complete search history.

(56) References Cited

U.S. PATENT DOCUMENTS 6,950,399 B1   9/2005   Bushmitch et al.

(Continued)

FOREIGN PATENT DOCUMENTS

EP          1113620 A1     7/2001

OTHER PUBLICATIONS

De Ketelaere, Tutorial Subscriber Management MIB, Definitions and Specifications, Aug. 8, 2005, pp. 1-41 and 1-41 (totaling 42 pages).
Agilent Technologies, DOCSIS Basics, pp. 1-34 (totaling 17 pages).
Cisco Systems, Appendix B—Relationships Between MIB Objects and CLI Show Commands, Aug. 9, 2005, pp. 1-23 and B-1 thru B-62 (totaling 43 pages).
Cisco Systems, Inc., Cisco CMTS Universal Broadband Router MIB Specifications Guide, Cisco ISO Release 12.3(9a)BC, Sep. 2004, pp. i-IN12 (totaling 238 pages).
Riley, CED Magazine, PCMM's Excellent Adventure, Early Trials Working to Prove Merits of PacketCable Multimedia, Jun. 2005, pp. 1-4 (totaling 4 pages).
Wang and Shin, Real-Time Computing Laboratory Department of Electrical Engineering and Computer Science, University of Michigan, Aug. 15, 2005, pp. 1-27 (totaling 14 pages).

(Continued)

*Primary Examiner*—Derrick W Ferris
*Assistant Examiner*—Mohammad Anwar
(74) *Attorney, Agent, or Firm*—Marger Johnson & McCollom, P.C.

(57) ABSTRACT

The present invention provides for enhanced packet classification. With the present invention packets are classified using both positive and negative classifiers. That is, a packet is classified based on both (a) whether or not the packet does meet certain criteria and, b) whether or not the packet does not meet certain other criteria. Thus packets can be classified into data flows based upon both positive and negative criteria.

21 Claims, 3 Drawing Sheets

U.S. PATENT DOCUMENTS

| | | |
|---|---|---|
| 7,012,891 B1 * | 3/2006 | Chandran et al. ............ 370/230 |
| 2002/0061012 A1 | 5/2002 | Thi et al. |
| 2002/0065907 A1 | 5/2002 | Cloonan et al. |
| 2002/0085552 A1 | 7/2002 | Tandon |
| 2002/0131426 A1 | 9/2002 | Amit et al. |
| 2005/0169255 A1 | 8/2005 | Shimomura et al. |
| 2005/0228892 A1 | 10/2005 | Riley et al. |
| 2005/0251846 A1 | 11/2005 | Dravida et al. |
| 2006/0149845 A1 * | 7/2006 | Malin et al. ................. 709/228 |
| 2007/0025243 A1 * | 2/2007 | Ayyagari et al. ............ 370/229 |

OTHER PUBLICATIONS

Allied Telesyn, How to Configure Filtering Actions on QoS Flow Groups and Traffic Classes, C613-16062-00 REV A, 2005, pp. 1-16 (totaling 8 pages).

Assure 24, Cisco-Docs-Remote-Query-MIB, Aug. 8, 2005, pp. 1-8 (totaling 8 pages).

Supplementary European Search Report issued on Nov. 25, 2009 corresponding to EP Application No. 06827899.

* cited by examiner

USE OF NEGATIVE CLASSIFIERS FOR INTERNET TRAFFIC

FIELD OF THE INVENTION

The present invention relates to the transmission of data over the Internet and more particularly to the classification of data flows.

BACKGROUND

Internet connects can handle a wide array of different types of data traffic. Some Internet traffic, such as e-mail and web browsing, can be handled on a "best effort" basis because such traffic can tolerate a substantial amount of latency, jitter and relatively low throughput without adversely affecting the end user's overall experience. Other types of Internet traffic, such as Voice over IP (VoIP) and MPEG video over IP, require an assured rate of throughput as such traffic is adversely affected by jitter and latency. That is, VoIP and MPEG video over IP have relatively strict requirements for latency, jitter and throughput. Such requirements frequently cannot be met on a best effort basis.

The baseline Internet Protocol (IP) does not provide any guarantees as to Quality of Service (QoS). However, various other protocols have been developed that can be used to ensure that a data flow obtains a specific QoS requirement.

The Data-over-Cable Service Interface Specification (DOCSIS) and the PacketCable Multimedia specification provide mechanisms whereby packets can be classified and divided into data flows, called "service flows". Each service flow can be given a specific QoS guarantee. Thus, for example, packets generated in a VoIP session can be directed to a specific service flow having the precise bandwidth, latency and jitter guarantees needed for a call, while other traffic (such as e-mail and web browsing) can be handled on a best effort basis and directed into a generic service flow, which typically does not have any service guarantees.

SUMMARY OF THE INVENTION

The present invention provides for enhanced packet classification. With the present invention packets are classified using both positive and negative classifiers. That is, a packet can be classified based on both (a) whether or not the packet does meet certain criteria and, (b) whether or not the packet does not meet certain other criteria. That is, packets can be classified into data flows based upon both positive and negative criteria.

DETAILED DESCRIPTION

Figure 1:
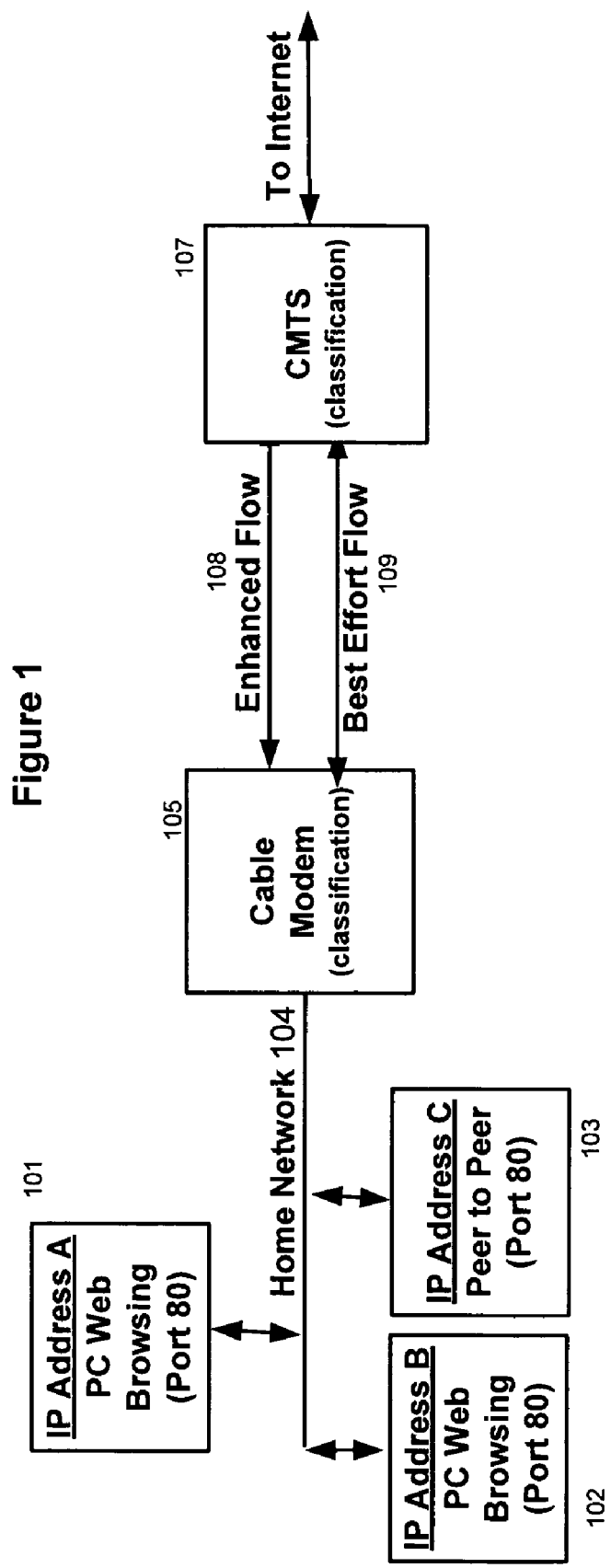
FIG. 1 illustrates a first embodiment of the present invention.

Several preferred embodiments of the present invention will now be described with reference to the accompanying drawings. Various other embodiments of the invention are also possible and practical. This invention may be embodied in many different forms and the invention should not be construed as being limited to the embodiments set forth herein.

The figures listed above illustrate preferred embodiments of the invention and the operation of such embodiments. In the figures provided herewith, the size of the boxes is not intended to represent the size of the various physical components. Where the same element appears in multiple figures, the same reference numeral is used to denote the element in all of the figures.

Only the parts and functions of the various embodiments which are necessary to convey an understanding of the embodiment to those skilled in the art are shown and described. Those parts and elements not shown are conventional and known in the art.

A first embodiment of the invention is illustrated in FIG. 1. The system shown in FIG. 1 includes a Cable Modem (CM) 105 and a Cable Modem Termination System (CMTS) 107. The CM 105 is connected to a home network 104. Three personal computers (PCs) 101, 102, and 103 are connected to the home network 104. The PCs 101, 102 and 103 can be considered network endpoints. The IP addresses of the three PCs 101, 102, and 103 are herein respectively designated as "A", "B" and "C". In the example illustrated, PCs 101 and 102 are being used for web browsing and PC 103 is being used for peer-to-peer downloading. It is noted that a home network (or a similar network in some other environment) may have more or less than three end points. Furthermore, each client may be running more than one application. In FIG. 1, only three end points are shown on the home network 104, and each client shown is running only one application. It should be understood that there may be other end points and other applications on the end points. Such other end points and applications would operate in a similar fashion to those shown and described herein.

As is conventional, the PCs 101, 102 and 103 send and receive IP packets to the Internet through CM 105 and CMTS 107. In this example, the CM 105 and the CMTS system 107 are configured to classify packets and then divide the data traveling between CM 105 and the CMTS system 107 into an enhanced service flow 108 and a best effort service flow 109. More bandwidth is allocated to enhanced flow 108 than to the best effort service flow 109. By allocating more bandwidth to the enhanced service flow 108, the traffic over this flow can be assured of a certain QoS. As described below, positive and negative classifiers are used to divide the packets into flows 108 and 109.

In the example illustrated in FIG. 1, the operator wants to provide the PCs being used for web browsing with enhanced QoS, that is, with more bandwidth than other applications on the subscriber's home network. The packets associated with other applications are directed to the best effort flow 109 by default. That is, the operator wants packets to and from the PC 103 which is doing peer to peer downloading to be handled on a best effort basis. Both the packets related to web browsing and those related to peer to peer downloading use port 80. In order to separate the traffic into different flows, the traffic is classified both positively and negatively. The classification can be as shown in the following table.

| Type of classification | Classifier Test |
| --- | --- |
| Positive | Traffic to or from port 80 |
| Negative | Traffic to or from IP address "C" which uses port 80 |

Figure 2:
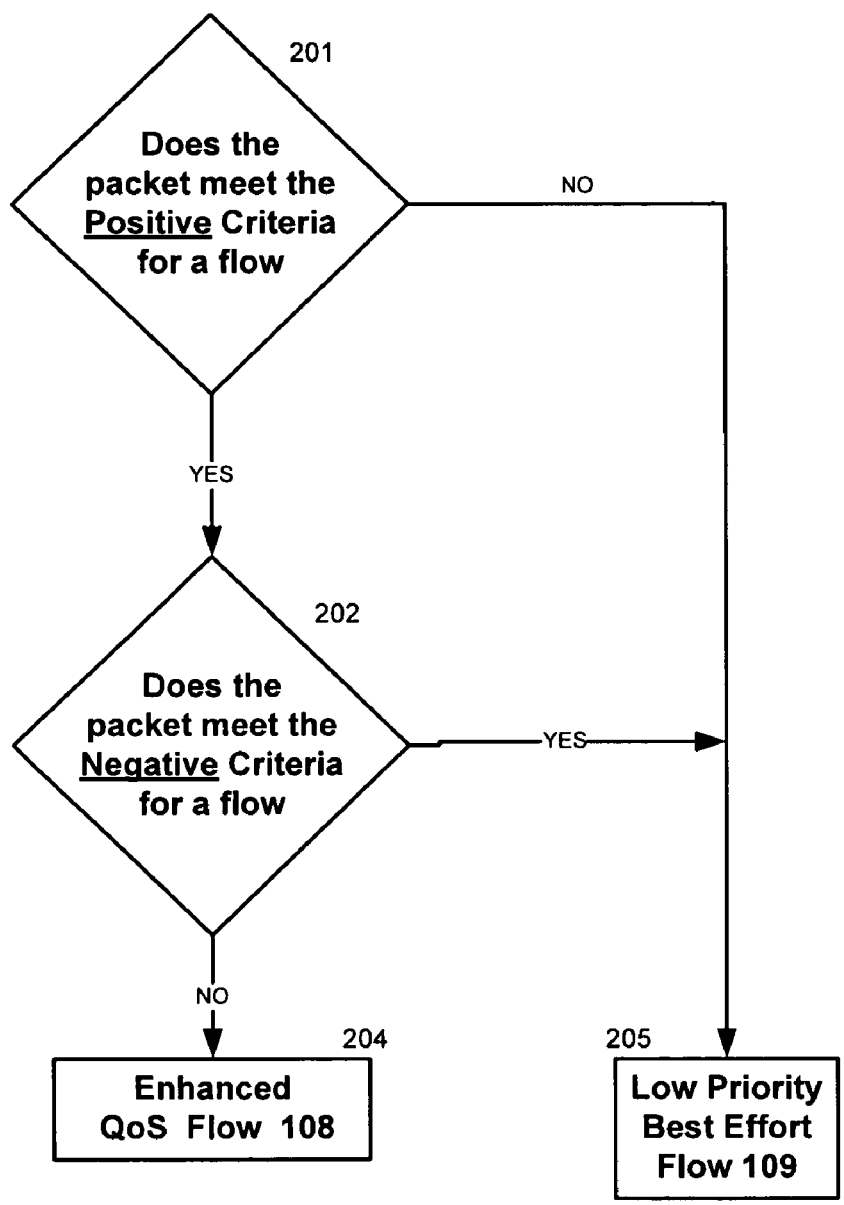
FIG. 2 is a block diagram illustration the operation of the system.

The flow chart shown in FIG. 2 explains how packets are classified. Packets are subjected to two tests. Packets are first examined to determine if they meet the positive criteria as indicated by block 201. That is, packets are examined to determine if they are destined for port 80. Those destined for port 80 are tentatively directed to the enhanced flow 108. However, following the first test, packets are subject to a second test as indicated by block 202. That is, packets are examined to determine if they are directed to or from IP address C using port 80.

Packets that meet the positive criteria and that do not meet the negative criteria are directed to the enhanced flow 108 as indicated by block 204. All other packets go to the best effort flow 109 as indicated by block 205.

Figure 3:
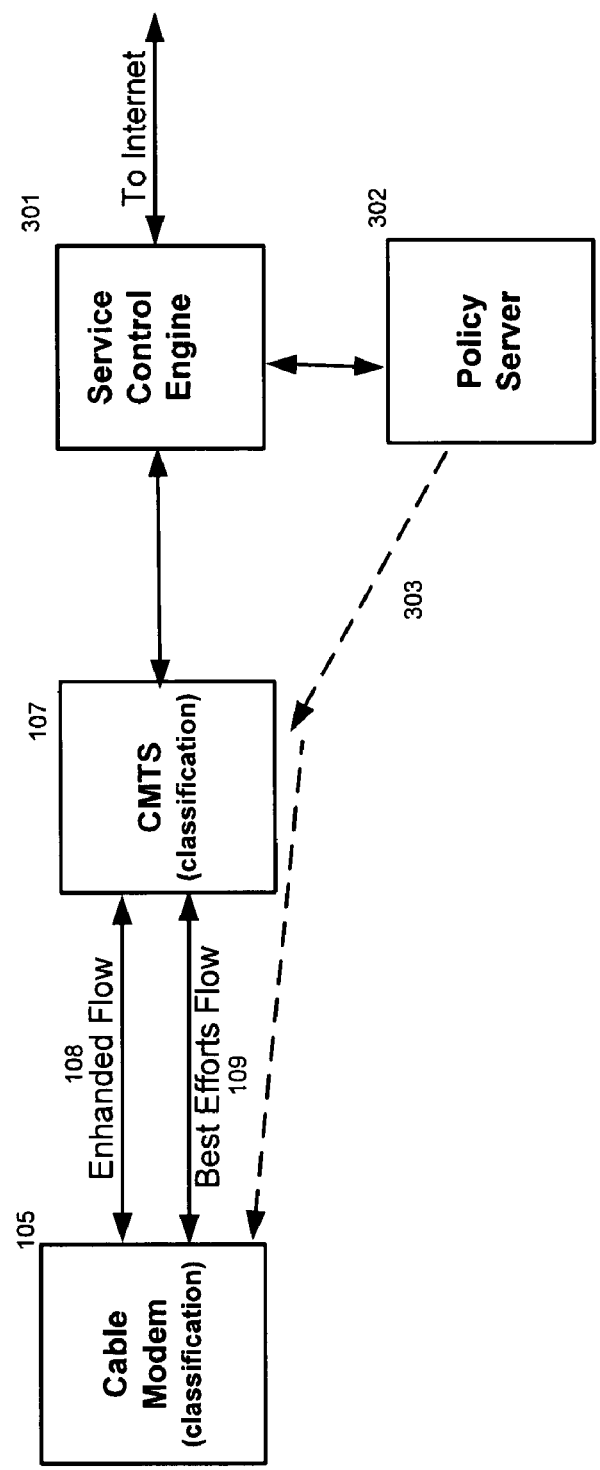
FIG. 3 illustrates other components in the first embodiment of the invention.

FIG. 3 shows how the classification criteria are established in the CM 105 and in the CMTS system 107. All packets going to and from the CMTS go through a service control engine 301. The service control engine 301 is a commercially available product that examines packets and generates statistics concerning the characteristics of packets passing through the engine. The service control engine 301 can, for example, be the service control engine marketed by Cisco System Inc. under the designation Service Control Engine (SCE) 2020. The SCE 2020 Series Service Control Engine is a network element that provides session-based classification and control of application-level IP traffic per subscriber. The SCE 2020 platform generates usage statistics on every subscriber and for each application and protocol used. This allows service providers to identify "abusive subscribers" or subscribers using particular applications in real time. This information can be used to develop appropriate classification screens.

The service control engine 301 provides statistics to the policy server 302. The policy server is configured at setup time (or during operation) to execute specified policies established by the system operator. That is, the policy server 302 establishes positive and negative classifiers for the CM 105 and the CMTS 107 in response to the (a) information from service control engine 301 and (b) to the policies that were established by the operator at set up time or at some later time.

The policy server 302 sends control information to the CMTS 107 to establish particular screens. That is, to establish particular positive and negative classification criteria. The CMTS 107, in turn, sends control information to the CM 105 to establish particular screens. The manner of sending control information from the CMTS 107 to the CM 105 is conventional. The dotted arrows 303 indicate that commands are transmitted from the policy server 302 to the CMTS 107. The CMTS then installs the classification criteria on the CM 105. The general process for installing the classification criteria is conventional. The dotted arrows 303 do not represent direct connections.

The policy server 302 implements policies that determine which resources and services a valid subscriber may access. In accordance with pre-established criteria, the policy server 302 can determine what classification schemes need be implemented in the CM 105 and the CMTS 107 in order to provide certain particular QoS to particular kinds of traffic. Rules can be established at set up time (or later) whereby particular screens (i.e. classifiers) are set up when particular patterns of traffic appear. It is noted that policy servers are commercially available devices that are available from a variety of manufactures. In this embodiment, in response to policies established by the operator, the policy server 302 creates both positive and negative classifiers as needed to implement various pre-established policies. For example, classifiers shown in the previously given table can be established when service control engine 301 detects a certain type of traffic.

Naturally, in response to more complicated policies in systems with more end points and applications, the set of classifiers can be much more complex. Furthermore, various different classifiers can be established dependent upon information received from service control engine 301.

The example shown in FIGS. 1, 2 and 3 is a relatively simple example. The positive and negative classifications can be much more complex and comprehensive. For example in other embodiments the classifications can take into account all the various classification allowed by the DOCSIS and PacketCable Multimedia specifications. The negative classifiers provided by the present invention can be utilized as an enhancement to the type of classification provided by the DOCSIS 1.1 and PacketCable Multimedia specifications.

DOCSIS (Data Over Cable Service Interface Specification) is a standard interface for cable modems for handling incoming and outgoing data signals between a CM and a CMTS. The International Telecommunication Union (ITU-TS) ratified DOCSIS 1.0 in March of 1998. CMs conforming to DOCSIS are now being commercially marketed. New features can be added to many existing CMs that conform to the DOCSIS specification by changing the programming in the CM's EEPROM memory. This is a standard process when upgrading CMs in the field.

The DOCSIS 1.1 specification introduced the concept of a "service flow" and the concept of a "service flow identifier" (SFID). A service flow represents either an upstream or a downstream flow of data that can be uniquely identified by a SFID. In a DOCSIS system, each service flow can be assigned its own QoS parameters known as a QoS Parameter Set. The upstream and the downstream service flows are decoupled, that is, they are (or can be) independent of each other.

In a very simple configuration a CM will be assigned a primary downstream SFID and a primary upstream SFID, each with its own unique QoS Parameter Set which defines the Quality of Service attributes of that SFID. These primary service flows are primarily responsible for passing MAC management traffic and all data which is not directed to a secondary service flow. Primary service flows are typically established as best effort service flows.

Multiple service flows can be assigned per CM in both the upstream or downstream direction, and each of these service flows can correspond to different a QoS parameter set with different characteristics. This allows a CM to simultaneously accommodate multiple kinds of data traffic with different Quality of Service requirements. For example, a CM can handle both standard Internet traffic and Voice over IP (VoIP), each using their own service flow.

Modern IP enabled services such as VoIP and MPEG Video over IP have a requirement for an assured rate of throughput, as well as strict requirements for latency and jitter. In general, these requirements cannot be satisfied in a best effort environment. In addition, these kinds of services are not typically always active and, as such, resources to accommodate them need only be allocated when these services are required. DOCSIS 1.1 provides a range of modes for CM data transmission that can be initiated and terminated dynamically to accommodate these advanced IP services. Each of these modes can be applied to a DOCSIS 1.1 QoS parameter set which will define the characteristics of a service flow. Various types of service flows can be created. With the present invention, the service flows can be defined with a combination of positive and negative classifiers. The types of service flows that can be defined with a combination of positive and negative classifiers include the following:

Unsolicited Grant Service (UGS): A UGS is a service flow that allows a CM to transmit fixed size bursts of data at a guaranteed rate and with a guaranteed level of jitter by providing periodic transmission opportunities to the CM for fixed sized frames. This kind of service flow is particularly suitable for Voice over IP applications.

Real-Time Polling Service (rtPS): A rtPS is a service flow that gives a periodic opportunity for a CM to request permission to transmit data by polling one CM for a bandwidth request, rather than all modems. This satisfies applications that have a requirement for real time data transmission as well as allowing the CM to transmit data bursts of varying length. This kind of service flow is particularly suitable for MPEG video over IP.

Unsolicited Grant Service with Activity Detection (UGS/AD): This kind of service flow is a combination of UGS and rtPS and is useful for services that require a UGS style of fixed size and fixed rate transmission opportunities, but have significant periods where no data is being sent. One good example of this might be a Voice over IP phone call where up to 50% or more of the call may be silence and require no data transmission. While words are being spoken and packetized voice needs to be transmitted, the CM receives UGS style grants from the CMTS. When there is silence, the CMTS detects the absence of data and switches to an rtPS style mode, which temporarily frees up upstream bandwidth. When the conversation restarts and the CM needs to transmit more packetized voice, the CM transmits a request to the CMTS via an rtPS granted opportunity and then the UGS style grants recommence.

Non-Real-Time Polling Service: This kind of service flow is similar to a rtPS; however, polling will typically occur at a much lower rate and may not necessarily be periodic. This applies to applications that have no requirement for a real time service but may need an assured high level of bandwidth. An example of this may be a bulk data transfer or an Internet Gaming application.

Best Effort Service: This kind of service flow allows a CM to request data transmit opportunities to transmit traffic; however, these requests must content with the request from other CMs on the cable network. This type of service flow is typical for data which does not have latency, jitter or bandwidth requirements.

Each of the above described kinds of service flows may be active for a CM simultaneously. Thus, real time and non real time applications can seamlessly coexist. Each of the above described service flow can be defined with a combination of positive and negative classifiers.

Classifiers: DOCSIS 1.1 provides a mechanism whereby CMs and CMTS units direct different kinds of IP traffic into different service flows. Different service flows can provide different levels of service to different kinds of traffic. Both positive and negative classifiers can be defined based on factors such as Source or Destination MAC address, 802.1Q VLAN ID, 802.1P priority, Source and Destination IP address or network, IP Protocol Type, Source or Destination Port number, IP Type of Service Bits, etc. and any combination thereof.

A somewhat more complex example of how a classifier might be used is as follows: Match VoIP traffic from a particular source IP address and source UDP port destined to a particular destination IP and destination UDP port, and direct that traffic into a dynamically created service flow that has a QoS parameter set providing a UGS mode of data transmission.

The present invention adds negative classifiers to the type of classifiers specified by the DOCSIS 1.1 specification. The negative classifiers are constructed and used in the same manner as the positive classifiers described in the DOCSIS 1.1 specification. As indicated in FIG. 2, after a packet has been tested to see if it meets the positive classification, it is tested again to determine if it meets the negative classification. That is, in an embodiment utilizing DOCSIS 1.1 or greater, the classification indicated by block 201 in FIG. 2 would be the conventional DOSSIS 1.1 or greater classification. With the present invention, a second test would be performed as indicated by block 202. This second test would be a negative test. That is, the packet would be direct to the QoS Service flow only if it did not meet the specified criteria in block 202.

Another alternate embodiment operates utilizing the PacketCable Multimedia specification modified to include negative classifiers. Such an embodiment operates similar to the embodiment described above.

It is noted that the links 108 and 109 shown in FIGS. 1 and 3 may be either physical links or logical links. Thus, the invention can be applied to the classification of packets over links that can be either physical links or logical links.

In still another alternative embodiment, the positive and negative classifiers to establish particular flows are established in CM 105 and CMTS 107 at system set up time by the system operator. Such an embodiment would not rely on a service control engine and a policy server to set up the classifiers.

While the invention has been shown and described with respect to various preferred embodiments thereof, it should be understood that a wide variety of other embodiments are possible without departing from the scope and sprit of the invention. The scope of the invention is only limited by the appended claims.

I claim:

1. A method of dividing Internet protocol (IP) packets into separate flows that are transmitted over different links, said method including at least one of a Cable Modem (CM) and a Cable Modem Termination System (CMTS) performing the steps of:
   determining whether said IP packets meet specified positive criteria using positive classifiers established by a policy server, wherein said determining comprises examining said IP packets to determine whether said IP packets are destined for a particular port;
   subsequently and separately determining whether said IP packets do not meet other negative criteria using negative classifiers established by the policy server, wherein said subsequent and separate determining comprises examining said IP packets to determine whether said IP packets are directed to or from a particular IP address using said particular port; and
   dividing said packets into flows based on the results of said determining and said subsequent and separate determining, wherein said dividing comprises:
      responsive to a determination that said IP packets meet said specified positive criteria and do not meet said other negative criteria, directing said IP packets to an enhanced flow; and
      responsive to a determination that said IP packets meet said specified positive criteria and meet said other negative criteria, directing said IP packets to a best effort flow.

2. The method recited in claim 1 wherein said classified packets are transmitted in flows on a link between said CM and said CMTS.

3. The method recited in claim 2 wherein said packets flow in both directions between said CM and said CMTS.

4. The method recited in claim 3 wherein packets are classified and divided into flows at both said CM and at said CMTS.

5. The method recited in claim 1 wherein one of said flows is transmitted on a best effort basis between said CM and said CMTS.

6. A non-transitory computer readable medium having stored thereon sequences of instructions for performing the method recited in claim 1 when executed by the at least one of said CM and said CMTS.

7. The method recited in claim 1 wherein said subsequent and separate determining whether said packets do not meet other negative criteria is responsive to a determination that said packets meet said specified positive criteria.

8. A system for dividing Internet protocol (IP) packets into separate flows that is transmitted over different links, said system including:
classification means comprising:
means for determining whether said IP packets meet specified positive criteria based on one or more positive classifiers, wherein said determining comprises examining said IP packets to determine whether said IP packets are destined for a particular port; and
means for separately determining whether said IP packets do not meet other negative criteria based on one or more negative classifiers, wherein said separate determining comprises examining said IP packets to determine whether said IP packets are directed to or from a particular IP address using said particular port;
means for directing said IP packets to an enhanced flow responsive to a determination that said IP packets meet said specified positive criteria and do not meet said other negative criteria; and
means for directing said IP packets to a best effort flow responsive to a determination that said IP packets meet said specified positive criteria and meet said other negative criteria.

9. The system recited in claim 8 including means for transmitting said classified packets in flows on a link between a Cable Modem (CM) to a Cable Modem Termination System (CMTS).

10. The system recited in claim 9 wherein said packets flow in both directions between said CM and said CMTS.

11. A system including a means for transmitting packets between a CM and a CMTS wherein both said CM and said CMTS include a classification means as recited in claim 8.

12. A system as recited in claim 8 wherein said means for determining if said packets meet specified positive criteria compares the characteristics of packets to said one or more positive classifiers as specified by a DOCSIS protocol.

13. A system as recited in claim 12 wherein said means for determining if said packets do not meet other negative criteria compares the characteristics of said packets to said one or more negative classifiers.

14. A system as recited in claim 8 wherein said means for determining if said packets do not meet other negative criteria compares the characteristics of said packets to said one or more negative classifiers.

15. A system as recited in claim 8 wherein said means for determining if said packets meet specified positive criteria compares the characteristics of packets to said one or more positive classifiers as specified by the Packet Cable Multimedia protocol.

16. A system as recited in claim 15 wherein said means for determining if said packets do not meet other negative criteria compares the characteristics of said packets to said one or more negative classifiers.

17. A method of dividing Internet protocol (IP) packets flowing from a first unit to a second unit into a plurality of separate flows that have different amounts of allocated bandwidth, said method including the steps of at least one of a Cable Modem (CM) and a Cable Modem Termination System (CMTS):
responsive to receiving information from a policy server, and based at least in part on one or more previously established policies, establishing positive classifiers and negative classifiers based on at least one of a group of factors consisting of source MAC address, destination MAC address, source IP address, destination IP address, source port number, destination port number, and IP protocol type,
determining if said packets meet the characteristics specified in said positive classifiers based on said at least one of said group of factors,
subsequently and separately determining if said packets do not meet the characteristics specified in said negative classifiers based on said at least one of said group of factors, and
dividing said packets into an enhanced flow responsive to a determination that said IP packets meet said specified positive criteria and do not meet said other negative criteria and into a best effort flow responsive to a determination that said IP packets meet said specified positive criteria and meet said other negative criteria.

18. A non-transitory computer readable medium having stored thereon sequences of instructions for performing the method recited in claim 17 when executed by the at least one of said CM and said CMTS.

19. The method recited in claim 17 wherein said classified packets are transmitted in flows on a link between a cable modem and a Cable Modem Termination System.

20. The method recited in claim 17 wherein said enhanced flow is transmitted with guaranteed QoS.

21. The method recited in claim 17 wherein said subsequent and separate determining if said packets do not meet the characteristics specified in said negative classifiers is responsive to a determination that said packets meet the characteristics specified in said positive classifiers.

* * * * *